United States Patent
DeHart et al.

(10) Patent No.: US 6,732,897 B2
(45) Date of Patent: May 11, 2004

(54) VENTURI INDUCER SYSTEM FOR TRANSFERRING MATERIAL

(75) Inventors: Robert DeHart, Mason, OH (US); Robert D. Simon, Gahanna, OH (US)

(73) Assignee: Airtrim, Inc., Springfield, OH (US)

( * ) Notice: Subject to any disclaimer, the term of this patent is extended or adjusted under 35 U.S.C. 154(b) by 0 days.

(21) Appl. No.: 10/234,737

(22) Filed: Sep. 4, 2002

(65) Prior Publication Data

US 2004/0042857 A1 Mar. 4, 2004

(51) Int. Cl.[7] .............................................. B65H 20/00
(52) U.S. Cl. ..................... 226/97.4; 406/92; 406/152; 406/153
(58) Field of Search .......................... 406/92, 152, 153; 226/97.1, 97.4

(56) References Cited

U.S. PATENT DOCUMENTS

| 2,791,470 | A | * | 5/1957 | Jolley ........................ 406/152 |
| 2,880,036 | A | * | 3/1959 | Larsson et al. ............... 406/14 |
| 3,559,860 | A | * | 2/1971 | East et al. .................. 226/97.4 |
| 4,215,805 | A | * | 8/1980 | Nielsen ..................... 226/97.4 |
| 4,545,221 | A | * | 10/1985 | Daniel et al. ............. 68/181 R |
| 4,813,460 | A | * | 3/1989 | Van Bogaert et al. ... 139/435.4 |
| 5,069,582 | A |   | 12/1991 | Young |
| 5,435,236 | A | * | 7/1995 | Weinstein et al. ............ 99/353 |
| 5,746,072 | A | * | 5/1998 | Bohnke ........................ 68/178 |

* cited by examiner

Primary Examiner—Joseph A. Dillon
(74) Attorney, Agent, or Firm—Jacox, Meckstroth & Jenkins

(57) ABSTRACT

A continuous supply of scrap material from a papermaking or converting process is transferred by a venturi inducer system including a housing surrounding a tubular intake duct which defines with the housing an annular air chamber connected to receive pressurized air from a motor driven blower. The housing has a tapered or frusto-conical portion connected to a tapered material outlet duct and which cooperates with the inner end of the intake duct to define an annular nozzle opening. Long adjustable bolts connect the intake duct to the housing outboard of the housing and provide for externally adjusting the intake duct axially for precisely selecting the area of the nozzle opening to optimize the air flow through the nozzle opening for pulling and transferring the material while minimizing the electrical power required to operate the blower motor.

17 Claims, 2 Drawing Sheets

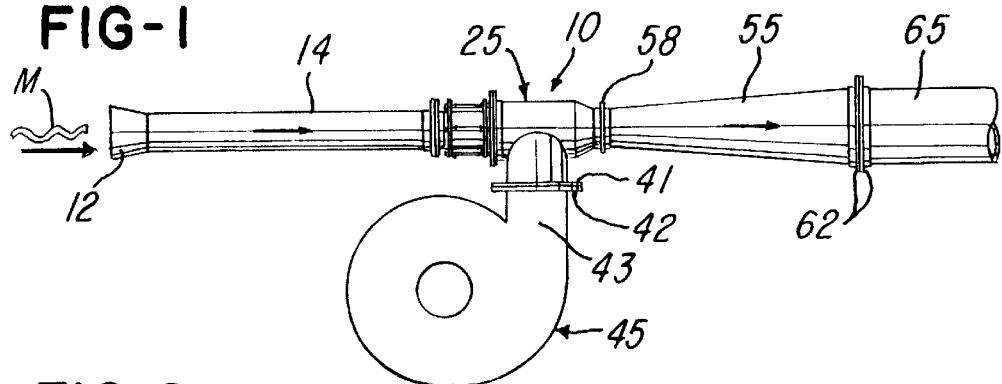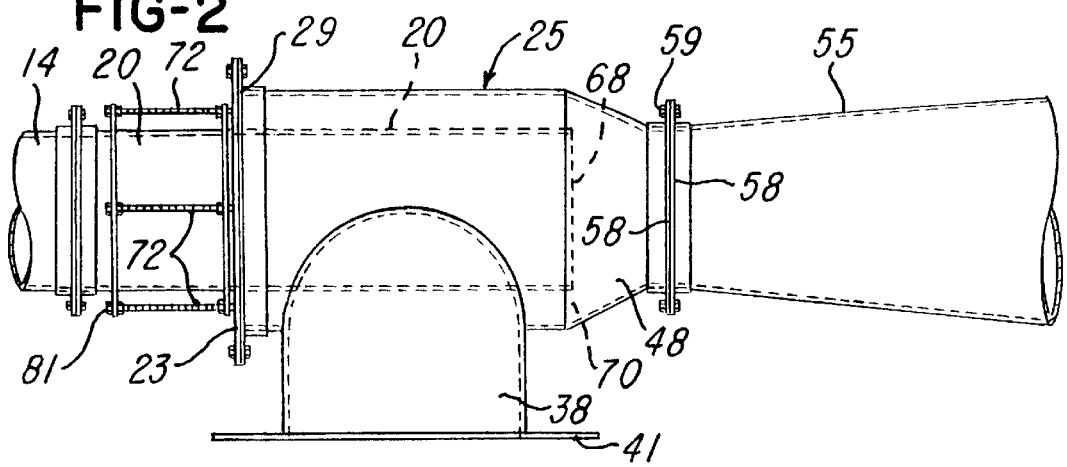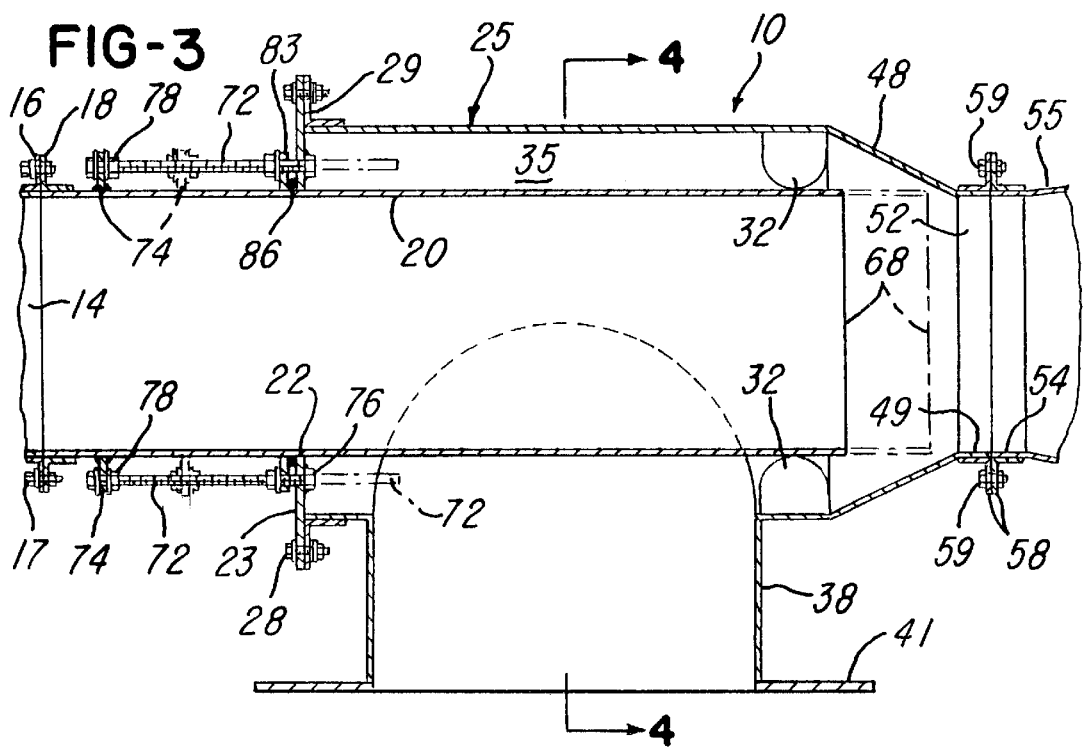

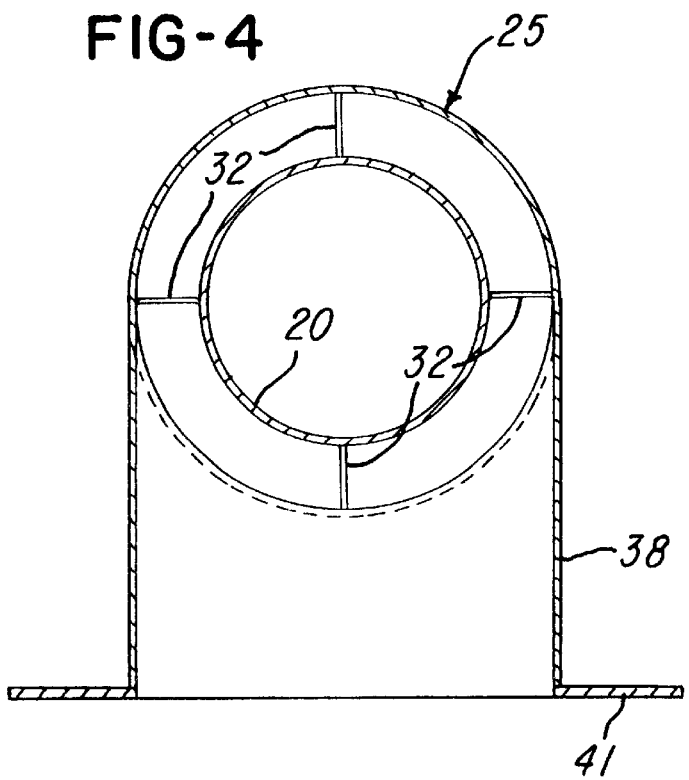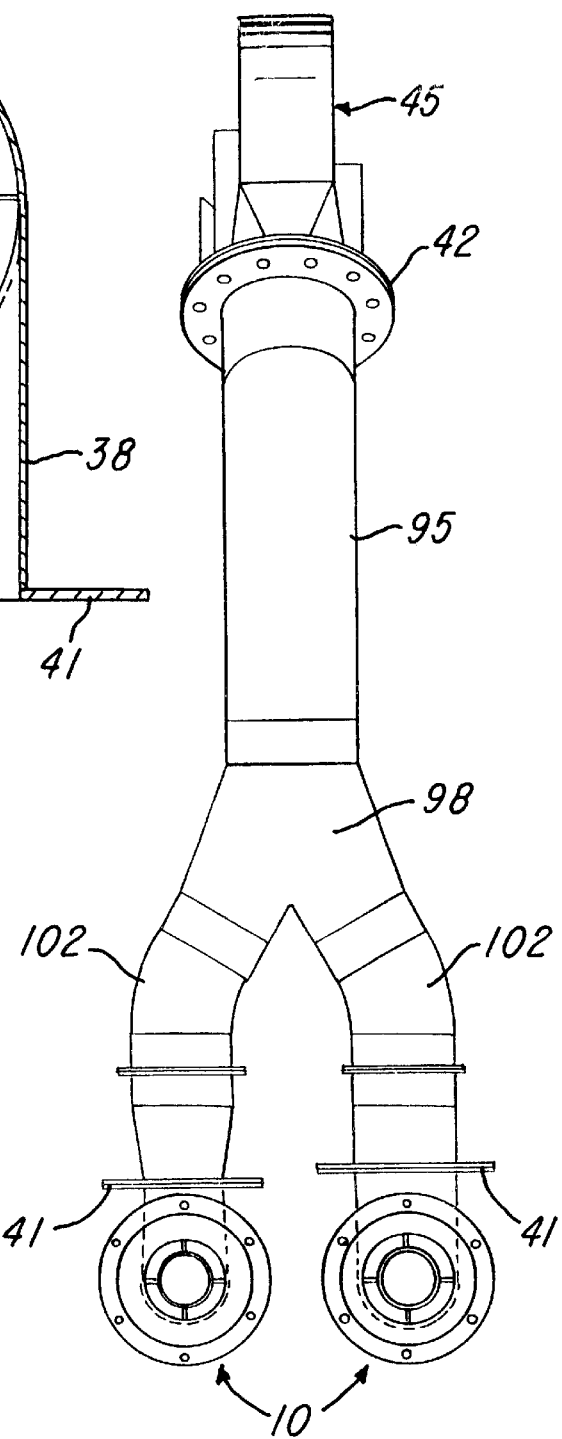

VENTURI INDUCER SYSTEM FOR TRANSFERRING MATERIAL

BACKGROUND OF THE INVENTION

In the papermaking and converting industries, scrap trim waste is continuously produced by trimming or die cutting equipment, and the trim waste is commonly carried away or transferred by a venturi inducer system of the general type, for example, disclosed in U.S. Pat. No. 5,069,582. The trim waste may be in the form of a continuous matrix or skeleton of pressure sensitive adhesive which originates from a label die cutting operation and is formed into a rope-like continuous supply, for example, as disclosed in U.S. patent application Ser. No. 09/657,244, filed Sep. 7, 2000 by the Assignee of the present invention.

As disclosed in the above-mentioned '582 patent, a continuous supply of scrap or trim material is directed into a suction device or venturi inducer having a cylindrical suction duct which connects with a cylindrical intake duct of the inducer. A generally cylindrical housing surrounds the intake duct and defines therebetween an annular air chamber which receives pressurized air from an electric motor driven blower. The housing has a frusto-conical or tapered end portion which cooperates with the inner end of the intake duct to define an annular nozzle gap or opening through which the pressurized air flows to induce, by a venturi action, a suction within the intake duct for pulling the continuous supply of material into the duct. The air flowing through the nozzle opening is directed through a throat for blowing the material into an outake or outlet duct which tapers slightly outwardly in diameter and connects with a cylindrical material transfer duct.

The size of the motor driven blower is selected according to the size of the inducer and the particular trim material to be transferred by the inducer and the velocity at which the trim material is produced. Usually, the air blower is selected with an electric motor having a higher horsepower rating than is actually needed since pressure blowers are available in only limited number of sizes. A damper valve is commonly used in the outlet of the pressure blower to provide for adjusting the air flow rate through the nozzle opening to select a sufficient flow rate to carry the trim material through the ducts. For example, while only twenty-six horsepower may be necessary to produce the necessary air flow through the nozzle opening to transfer the material, it is necessary to select a blower having a thirty horsepower electric motor. A damper is then used to reduce the blower output to twenty-six horsepower. The manufacturer of the blowers commonly provide charts which show the performance of the blowers in terms of horsepower versus cubic feet per minute of air flow.

After a venturi inducer system has been installed in a duct system for conveying a particular waste or trim material, it has been found highly desirable to provide for adjusting the area of the annular nozzle opening within the inducer in order to obtain the optimum air flow rate for transferring the material while minimizing the horsepower required from the blower motor.

SUMMARY OF THE INVENTION

The present invention is directed to an improved venturi inducer system of the general type described above and which incorporates means for externally and infinitely adjusting the inner end of the intake duct axially after the system has been installed. This adjustment thus provides for precisely adjusting the annular area of the nozzle opening for selecting the air flow rate and the velocity of air flowing through the nozzle opening according to the mass and speed of trim material being continuously supplied in order to avoid plugging of the ducts. The inducer system of the invention also provides for minimizing the electrical power required by the blower motor and thus eliminates the need for oversizing the blower motor. The inducer system of the invention further provides for using one blower with a plurality of at least two inducers of the same size or different sizes since the nozzle opening of each inducer may be individually adjusted. This results in a lower investment cost for equipment used in the system.

In accordance with one embodiment of the invention, the inducer housing includes an end wall which supports the cylindrical intake duct for axial movement. A set of circumferentially spaced and axially extending elongated bolts extend through an annular flange secured to the intake duct and are threaded into nuts secured to the housing end wall to provide for adjusting the intake duct axially to adjust the area of the nozzle opening. An annular sliding flange surrounds the intake duct adjacent the housing end wall and is engaged by nuts on the threaded bolts for clamping a resilient O-ring between the flange and the end wall to form a fluid-tight seal between the end wall and the intake duct.

Other features and advantages of the invention will be apparent from the following description, the accompanying drawings and the appended claims.

BRIEF DESCRIPTION OF THE DRAWINGS

FIG. 1 is an elevational view of a venturi inducer system constructed in accordance with the invention and shown installed in duct work for transferring scrap trim material;

FIG. 2 is an enlarged elevational view of the venturi inducer shown in FIG. 1;

FIG. 3 is a somewhat larger axial section of the inducer shown in FIG. 2;

FIG. 4 is a radial section taken generally on the line 4—4 of FIG. 3; and FIG. 5 is an elevational view of system including a pair of inducers operated by a single air pressure blower in accordance with the invention.

DESCRIPTION OF THE PREFERRED EMBODIMENTS

FIG. 1 illustrates a venturi inducer system 10 which is used for carrying away or transferring a continuous supply of scrap trim material M which may be, for example, a continuous solid strip having a width of several inches or a pressure sensitive adhesive matrix having a width, for example, up to twenty four inches or greater. The material is directed into a funnel-like tapered inlet 12 of a cylindrical suction duct 14 having an end flange 16 (FIG. 3) coupled by circumferentially spaced bolts 17 to an end flange 18 on an axially aligned cylindrical intake duct 20. The intake duct extends through a circular opening 22 of a circular end wall 23 of a cylindrical housing 25. A series of circumferentially spaced bolts 28 secure the outer peripheral edge portion of the end wall 23 to a circumferentially extending flange 29 on the housing 25. The opening 22 provides sufficient clearance for the intake duct 20 to slide axially within the end wall 23.

A series of four circumferentially spaced ribs or vanes 32 (FIGS. 3 and 4) are secured or welded to the inner surface of the housing 25 and project radially inwardly to support the inner end portion of the intake duct 20 for sliding axial movement. An annular air chamber 35 is defined between the intake duct 20 and the housing 25 and is adapted to receive pressurized air through a cylindrical duct 38 secured or welded to the housing 25. The duct 38 has an outwardly projecting peripheral flange 41 which is connected to a mating flange 42 secured to an outlet portion 43 of a pressurized air blower 45 having an impeller driven by an electric motor.

The housing 25 has a tapered frusto-conical portion 48 which extends to a cylindrical end portion 49 defining a circular throat opening 52. The cylindrical end portion 49 of the housing 25 is coupled with a cylindrical end portion 54 of a tapered outlet duct 55 by a pair of mating circumferential flanges 58 and a series of circumferentially spaced bolts 59 extending through holes within the flanges. The tapered outlet duct 55 has an opposite end connected by a pair of mating flanges 62 and circumferentially spaced bolts (not shown) to a cylindrical transfer duct 65.

As shown in FIG. 3, the intake duct 20 has an inner end 68 which cooperates with the tapered portion 48 of the housing 25 to define an annular nozzle gap or opening 70. The pressurized air flowing from the blower 45 into the annular chamber 35 flows through the nozzle opening 70 to produce a venturi action which induces a suction within the intake duct 20 and the suction duct 14 for pulling the material M through the ducts. The pressurized air flowing through the nozzle gap 70 and throat opening 52 and into the outlet duct 55 also forces the continuous supply of material through the ducts 55 and 65 to the final outlet for the material or to another venturi inducer system 10 located downstream of the transfer duct 65.

In accordance with the present invention, the nozzle opening 70 is externally adjustable after the inducer system 10 has been installed so that the precise air flow and air velocity may be selected to maintain a continuous flow of material through the duct system with a minimum use of electrical power required to operate the electric motor of the blower 45. The adjustment of the nozzle gap or opening 70 is accomplished by adjusting the intake duct 20 axially within the housing 25. This adjustment is provided by a plurality of elongated bolts 72 which extend axially through corresponding holes within a circumferential flange 74 secured or welded to the outer end portion of the intake duct 20. The bolts 72 extend through corresponding holes within the end wall 23 and are threaded into corresponding nuts 76 secured or welded to the inner surface of the end wall 23.

One set of lock nuts 78 are threaded on the bolts 72 adjacent the flange 74 and oppose the hexagonal heads 81 of the bolts 72. Another set of lock nuts 78 are threaded onto the bolts 72 adjacent an annular flange 83 located adjacent the end wall 23, and the flange 83 is free to slide on the intake duct 20. A resilient O-ring 86 is confined between the flange 83 and the end wall 23 and closely surrounds the intake duct 20 so that when the flange 83 is clamped towards the end wall 23 by the nuts 78, the O-ring 86 forms a fluid-tight seal between the end wall 23 and the outer surface of the intake duct 20. As apparent from FIG. 3, the long bolts 72 provide for substantial axial movement of the intake duct 20, for example, on the order of several inches, so that the area of the nozzle gap or opening 70 may be substantially adjusted, as illustrated by the phantom lines in FIG. 3.

Referring to FIG. 5, it is also within the scope of the invention to operate a plurality or two venturi inducer 10 from a single pressure blower 45 since the intake duct 20 within each inducer 10 may be individually adjusted according to the air flow rate and air velocity required for sucking and blowing the trim material into and through each of the inducers. As shown, the outlet flange 42 of the blower 45 is connected by duct works including a straight duct 95 which supplies pressurized air to a split or "Y" duct 98 which directs a portion of the pressurized air to each of the inducers 10 through a duct system 102 coupled to the flange 41 of each inducer 10. As mentioned above, the inducers 10 may be of the same size or of different sizes.

What is claimed is:

1. A venturi inducer system adapted for transferring a continuous supply of material including trim waste from a papermaking or converting process, said system comprising an elongated tubular intake duct having a center axis and adapted to receive the material, a housing surrounding said intake duct and cooperating to define a generally annular chamber therebetween, said housing having a tapered annular portion cooperating with an inner end of said intake duct to define a generally annular nozzle opening, said housing chamber having an air inlet adapted for receiving pressurized air from a source, a tubular outlet duct connected to said housing for receiving pressurized air flowing through said nozzle opening, said pressurized air flowing through said nozzle opening forming a venturi effective to induce a suction air flow in said intake duct for pulling the material through said intake duct and for blowing the material into said outlet duct, and a plurality of adjustable members connected to said intake duct and operable to adjust said inner end of said intake duct axially within said housing for precisely adjusting the area of said nozzle opening to adjust the flow rate of air through said nozzle opening.

2. A system as defined in claim 1 wherein said plurality of adjustable members comprises at least one elongated threaded rod extending generally parallel to said axis of said intake duct.

3. A system as defined in claim 2 and including a plurality of said threaded rods circumferentially spaced around said intake duct.

4. A system as defined in claim 1 wherein said housing includes an annular end wall surrounding said intake duct, and an annular resilient sealing member forming a fluid-tight seal between said housing and said intake duct and providing for axial movement of said intake duct.

5. A system as defined in claim 1 and including a plurality of spacer members extending within said chamber between said housing and said intake duct and supporting an inner portion of said intake duct for axial movement.

6. A system as defined in claim 1 wherein said source of pressurized air comprises a motor driven blower having an outlet, and a plurality of said inducer systems having corresponding said air inlets of corresponding said housing chambers connected to said outlet of said blower.

7. A venturi inducer system adapted for transferring a continuous supply of material including trim waste from a papermaking or converting process, said system comprising an elongated tubular intake duct having a center axis and adapted to receive the material, a housing surrounding said intake duct and cooperating to define a generally annular chamber therebetween, said housing including an end wall having an opening supporting said intake duct adapted for sliding axial movement, said housing having a tapered annular portion cooperating with an inner end of said intake duct to define a generally annular nozzle opening, said housing chamber having an air inlet adapted for receiving pressurized air from a source, a tubular outlet duct connected to said housing for receiving pressurized air flowing through said nozzle opening, said pressurized air flowing through said nozzle opening forming a venturi effective to induce a suction air flow in said intake duct for pulling the material through said intake duct and for blowing the material into said outlet duct, and at least one elongated threaded rod connecting said intake duct to said end wall of said housing for adjusting said intake duct axially within said housing to adjust said inner end of said intake duct relative to tapered annular portion for adjusting the area of said nozzle opening to adjust the flow rate of air through said nozzle opening.

8. A system as defined in claim 7 and including a plurality of said threaded rod extend generally parallel to said axis of said intake duct, and said rods are spaced circumferentially around said intake duct.

9. A system as defined in claim 7 and including an annular flange surrounding said intake duct adjacent said end wall, an annular resilient sealing member between said flange and said end wall and forming a fluid-tight seal between said end wall and said intake duct, and said flange being releasable to provide for said axial movement of said intake duct.

10. A system as defined in claim 7 and including a plurality of spacer members extending within said chamber between said housing and said intake duct and supporting an inner portion of said intake duct for said axial movement.

11. A system as defined in claim 7 wherein said source of pressurized air comprises a motor driven blower having an outlet, and a plurality of said inducer systems having corresponding said air inlets of corresponding said housing chambers connected to said outlet of said blower.

12. A venturi inducer system adapted for transferring a continuous supply of material including trim waste from a papermaking or converting process, said system comprising an elongated tubular intake duct having a center axis and adapted to receive the material, a housing surrounding said intake duct and cooperating to define a generally annular chamber therebetween, said housing having a tapered annular portion cooperating with an inner end of said intake duct to define a generally annular nozzle opening, said housing chamber having an air inlet adapted for receiving pressurized air from a source, a tubular outlet duct connected to said housing for receiving pressurized air flowing through said nozzle opening, said pressurized air flowing through said nozzle opening forming a venturi effective to induce a suction air flow in said intake duct for pulling the material through said intake duct and for blowing the material into said outlet duct, at least one axially oriented adjustable member outboard of said housing and directly connected to said intake duct, and said adjustable member is operable externally of said housing to adjust said inner end of said intake duct axially within said housing for precisely adjusting the area of said nozzle opening to adjust the flow rate of air through said nozzle opening.

13. A system as defined in claim 12 wherein said adjustable member comprises at least one elongated threaded bolt extending generally parallel to said axis of said intake duct.

14. A system as defined in claim 13 and including a plurality of said threaded bolts circumferentially spaced around said intake duct.

15. A system as defined in claim 12 wherein said housing includes an annular end wall surrounding said intake duct, and an annular resilient sealing member forming a fluid-tight seal between said housing and said intake duct and providing for axial movement of said intake duct.

16. A system as defined in claim 12 and including a plurality of spacer members extending within said chamber between said housing and said intake duct and supporting an inner portion of said intake duct for axial movement.

17. A system as defined in claim 12 wherein said source of pressurized air comprises a motor driven blower having an outlet, and a plurality of said inducer systems having corresponding said air inlets of corresponding said housing chambers connected to said outlet of said blower.

* * * * *